United States Patent [19]
Avotins et al.

[11] Patent Number: 5,853,677
[45] Date of Patent: *Dec. 29, 1998

[54] CONCENTRATION OF SOLIDS BY FLOCCULATING IN THE BAYER PROCESS

[75] Inventors: Peter V. Avotins, Easton; Roderick G. Ryles, Milford, both of Conn.; Gregory Flieg, Prairieville, La.

[73] Assignee: Cytec Technology Corp., Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 844,354

[22] Filed: Apr. 18, 1997

Related U.S. Application Data

[60] Provisional application No. 60/017,360 Apr. 26, 1996.

[51] Int. Cl.$^6$ .............................. C01F 7/00; C22B 21/00; B03D 3/06; B01D 21/01
[52] U.S. Cl. ......................... 423/121; 423/122; 210/732; 210/733; 210/734; 210/735; 210/787; 209/5
[58] Field of Search ................................... 423/121, 122; 210/732, 733, 734, 735, 787; 209/5

[56] References Cited

U.S. PATENT DOCUMENTS

| | | |
|---|---|---|
| 3,345,344 | 10/1967 | Fetscher et al. . |
| 3,390,959 | 7/1968 | Sibert ........................................ 23/143 |
| 3,681,012 | 8/1972 | Sibert ........................................ 23/143 |
| 3,975,496 | 8/1976 | Smalley et al. .......................... 423/122 |
| 4,083,925 | 4/1978 | Green et al. ............................. 423/121 |
| 4,478,795 | 10/1984 | Hereda et al. ........................... 423/121 |
| 4,480,067 | 10/1984 | Vio et al. . |
| 4,532,046 | 7/1985 | Meunier et al. . |
| 4,536,296 | 8/1985 | Vio . |
| 4,587,306 | 5/1986 | Vio et al. . |
| 4,767,540 | 8/1988 | Spitzer et al. ........................... 210/728 |
| 4,902,751 | 2/1990 | Lewellyn et al. . |
| 4,994,244 | 2/1991 | Fulford et al. .......................... 423/121 |
| 5,120,513 | 6/1992 | Moody et al. ........................... 423/122 |
| 5,128,420 | 7/1992 | Domb et al. . |
| 5,133,874 | 7/1992 | Spitzer et al. ........................... 423/121 |
| 5,217,620 | 6/1993 | Mahoney et al. . |
| 5,539,046 | 7/1996 | Lewellyn . |
| 5,601,726 | 2/1997 | Cole . |
| 5,607,598 | 3/1997 | Williams . |
| 5,665,244 | 9/1997 | Rothenberg et al. . |

FOREIGN PATENT DOCUMENTS

| | | |
|---|---|---|
| 0 367 437A | 5/1990 | European Pat. Off. . |
| 0 382 383 A2 | 8/1990 | European Pat. Off. . |
| 924112 | 7/1947 | France . |
| 2236010 A | 1/1975 | France . |
| 74018558 | 10/1905 | Japan . |
| 56092116 | 12/1926 | Japan . |
| 56092116 | 7/1981 | Japan . |
| 507526 | 6/1921 | Russian Federation . |
| 2080272 | 7/1923 | United Kingdom . |
| 2112366 | 12/1930 | United Kingdom . |
| 2171127 | 8/1986 | United Kingdom . |

OTHER PUBLICATIONS

U.S. Application No. 08/744,811.
Chemical Abstracts, vol. 98, No. 16, Apr. 18, 1983, Columbus, Ohio, US; Abstract No. 128638e, V.M. Komandenko et al.: "Thickening pulps containing aluminum hydroxide".
T.K. Hunter, G. M. Moody, S.E. Sankey, C. A. Tran, "Advances with Chemical Additives for the Alumina Industry," Feb. 17, 1991, Light Metals 1991, pp. 159–165.
Eisetsu Or and Hiroshi Kamegaya: "Dewatering of Red Mud by a Centrifuge," Kogai Shigen Kenkyusho Iho, vol. 6, No. 3 pp. 15–21, 1976, no month.
Rothenberg, A. S.: "New Reagents for Alumina Processing," Light Metals 1989, pp. 91–96, Feb.–Mar.
*International Journal of Mineral Processing*, 3 (*1976*) 27–34, "Selective Flocculation of Cassiterite in Mixtures with Quartz Using a Modified Polyacrylamide Flocculant," C.R.A. Clauss, E.A. Appelton* and J.J. Vink, no month.
U.S. Patent Application Serial No. 60/006,300 entitled Concentration of Solids in the Bayer Process filed Nov. 7, 1995 (Provisional Patent Application).
Industrial Environmental Research Laboratory, U.S. Environmental Protection Agency, EPA–600/2–76–301, Dec. 1976, "An Assessment of Technology for Possible Utilization of Bayer Process Muds," B.K. Parekh, W.M. Goldberger.
*Operations Forum*, Oct., 1988, 24–27, "Centrifuge Trade–Offs, Operation Tips for Sludge Handling," Daniel E. Sullivan, Ph.D, P. Aarne Vesilind, Ph.D.
*Ullmann's Encyclopedia of Industrial Chemistry, Fifth, Completely Revised Edition*, vol. B–2, 11, 1–27, "Centrifuges and Hydrocyclones," Helmut Trawinski, Amberger Kaolinwerke GmbH, Hirschau/Oberpfalz, Federal Republic of Germany, no date.

Primary Examiner—Steven Bos
Attorney, Agent, or Firm—Joseph J. Mallon

[57] ABSTRACT

Processes for improving solids/liquids separation efficiency in the Bayer process are disclosed, wherein Bayer process streams are treated with calcium or magnesium salts, flocculated with carboxylic acid or salt group-containing polymers, and centrifuged.

19 Claims, No Drawings

CONCENTRATION OF SOLIDS BY FLOCCULATING IN THE BAYER PROCESS

This application claims benefit of provisional application 60/017,360 filed Apr. 26, 1996.

FIELD OF THE INVENTION

The present invention is directed to a process of alumina manufacture via the Bayer process. More particularly, it is concerned with improvements in the Bayer alumina process by the removal of suspended solids by contacting process streams with a multivalent cationic salt and a polymer which contains carboxylic acid groups or salts thereof, flocculating said suspended solids, and subjecting the resultant flocculated solids to centrifugation.

BACKGROUND OF THE INVENTION

The most common process for the manufacture of alumina is the Bayer process. In a typical commercial Bayer process, raw bauxite ore is pulverized to a finely divided state. The pulverized ore is then fed to a slurry mixer where a slurry is prepared using water, spent liquor and added caustic. This bauxite slurry is then diluted and sent through a series of digesters where, at about 300°–800° F. and 100–2000 p.s.i., most of the total available alumina is extracted from ore which may contain both trihydrate and monohydrate forms of alumina. The effluent from the digesters passes through a series of flash tanks wherein heat and condensate are recovered as the digested slurry is cooled to about 230° F. and brought to atmospheric pressure. The aluminate liquor leaving the flashing operation (blow-off discharge) generally contains about 1–20% solids, which consist of the insoluble residues that remain after reaction between the bauxite ore and basic material used to digest the ore and the insoluble products which precipitate during digestion. Herein, all percentages are by weight, based on total weight, unless otherwise stated. The coarser solid particles are generally removed with a "sand trap" cyclone. To separate the finer insoluble solid particles from the liquor, the slurry is normally fed to the center well of a primary mud settler where it is treated with a flocculant such as a polyacrylamide polymer, polyacrylate polymer, hydroxamated polymer, flour and/or starch. As the mud settles, clarified aqueous sodium aluminate solution, referred to as "green" or "pregnant" liquor, overflows a weir at the top of the mud settling tank and is passed to the subsequent process steps. The settled solids ("red mud") are withdrawn as underflow from the bottom of the primary mud settler and passed through a countercurrent washing circuit, generally comprised of a series of washers, for recovery of sodium aluminate and soda. Sodium aluminate solution overflowing the primary settler still contains typically 50 to 200 milligrams of suspended solids per liter. This solution is then generally further clarified by filtration to give a filtrate with less than about 10 milligrams suspended solids per liter of liquor. After passage through the filtration step, the level of suspended solids should be sufficiently low to provide an alumina product from the precipitation step which meets all of the industry standards.

Alumina, in relatively pure form, is then precipitated from the filtrate as alumina trihydrate crystals. The remaining liquid phase or spent liquor is returned to the initial digestion step and employed as a digestant of additional ore after being reconstituted with additional caustic.

The efficient removal of suspended solids from Bayer process streams has been a major problem for many years. The aforementioned insoluble components should be separated at a relatively fast rate to make the overall Bayer process efficient. Ideally, a highly efficient Bayer process would separate the insoluble materials from the aluminate liquor cleanly and completely, to give high solids red mud containing little or no caustic or sodium aluminate solution, and sodium aluminate solution with little or no insoluble dispersed residue.

Among the methods of overcoming the above problems and materially speeding up separation of suspended solids from process streams as well as effecting a cleaner separation of the constituents are those disclosed in U.S. Pat. No. 3,390,959 which employs polyacrylates as anionic flocculants and U.S. Pat. No. 3,681,012, which uses combinations of polyacrylates and starch in Bayer alumina recovery circuits. Also of interest in this connection are U.S. Pat. No. 3,975,496 which uses a copolymer of acrylic acid and methylolated acrylamide for the same purpose, and U.K. Patent Specification Nos. 2080272 and 2112366, which use, sequentially, combinations of polyacrylic acid and acrylate-acrylamide copolymers. Other approaches have been proposed: in Japanese Patent Publication No. 56092116 (Jul. 25, 1981) is disclosed starch cationized with a quaternary ammonium salt for use as a coagulant; U.S. Pat. No. 4,083,925 promotes separation from alkali metal aluminate liquor by contacting it with anionic polyacrylamide under special conditions within the mud settler; East German (DE) Pat. No. 2552804 (Aug. 11, 1977) subjects starch to treatment with sodium tetraborate and a magnesium salt to provide improved flocculating properties with lower levels of starch; Russian Pat. No. 507526 (Apr. 6, 1976) reports that cationic flocculants of the formula (R—AR—$CH_2$—N—Ph)$^+$ Cl$^-$ are better for solids flocculation than other known flocculants; Japanese Pat. No. J74018558 (Oct. 5, 1974) discloses using an inorganic calcium compound and sodium polyacrylate for sedimentation and filtration. The use of hydroxamated polymers as flocculants for cassiterite is disclosed in Jour. So. African Inst. of Mining and Metallurgy; Vol. 76; pgs. 117–119 (1975) by Appleton et al. Polymers containing hydroxamic acid groups for reduction of suspended solids in Bayer process streams are described in U.S. Pat. No. 4,767,540, which is hereby incorporated herein by reference. Separation processes such as settling in the presence of a synthetic flocculant, filtering, or centrifugation, wherein the separation must be carried out at a pressure above atmospheric pressure, are described in U.S. Pat. No. 4,994,244. Copending application Ser. No. 60/006,300, which is hereby incorporated herein by reference, discloses that greatly improved dewatering of Bayer process streams, particularly settler underflow and digester blow-off, is obtained by a combination of centrifugation and the use of, as a flocculant, a polymer which contains hydroxamic acid groups. Although the discovery that centrifugation of Bayer process streams could be achieved by using hydroxamated polymers was a significant advance, it was found that certain red muds, particularly those containing high levels of free caustic, were difficult to centrifuge.

Because of the rheological characteristics of the solids in most Bayer process streams, including flocculated solids, centrifugation is not typically used to separate solids from the process stream. Instead, separation of the solids is generally accomplished by the use of settlers, decanters, thickeners, classifiers, and filters. With the exception of filters, these devices rely on the gravitational settling of the solids to achieve separation. Flocculation of the solids aids in the settling process by tending to agglomerate smaller particles into larger ones, which tend to settle faster. Flocculation also aids in the filtering process because larger agglomerates are easier to filter than smaller ones, and less likely to plug the filtering means.

"Red mud" is generally obtained as the underflow from a settler. It consists mainly of extremely fine, difficult-to-filter, insoluble residue that remains after the caustic-soluble components have been extracted. Typically, the red mud underflow from a primary settler passes through a countercurrent washing circuit, generally comprised of a series of washers, for recovery of sodium aluminate and soda. Current practice is to dispose of the last washer underflow stream and other red mud streams by pumping them as a relatively dilute slurry to holding ponds and lakes constructed for that purpose. The practical limit of such a slurry is 25 to 40 percent solids; 40 percent solids content is usual. Those skilled in the art agree that red mud impoundment is not an ideal solution to the disposal problem. The dikes of mud lakes must be maintained, and there is always the risk of a break and spill of the mud into a nearby stream or waterway. In addition, the large amounts of water going to the impoundment along with the suspended mud may contain caustic and solubilized alumina, which are lost from the process and present a large economic penalty.

Experts have studied the problem of red mud utilization, e.g. "An Assessment of Technology for Possible Utilization of Bayer Process Muds" by B. K. Parekh and W. M. Goldberger, U.S. Environmental Protection Agency, Off. Res. Dev., EPA-600/2-76-301 (1976), which is hereby incorporated herein by reference. Virtually all potential commercial uses of the muds require that the muds be dewatered to the extent that the solids can be transported and/or stored in a consolidated dry form without tendency to leach or pulp. Low-cost dewatering of the muds is therefore considered the key to their possible future utilization. It would be very advantageous to increase the solids content of red mud. High-solids mud could be economically transported to other locations and utilized as an ingredient in e.g. ceramics, cement, construction materials, etc. Such uses might also mitigate the impoundment problem. Centrifugation is a well-known process for achieving solid-liquid separations, but has not been typically used to dewater red mud. It is known to those skilled in the art that centrifugation of red mud is only marginally effective for increasing the solids.

Surprisingly, it has now been discovered that greatly improved dewatering of Bayer process streams, particularly settler underflow, washer underflow, and digester blow-off, may obtained by a combination of (a) centrifugation, (b) the use of, as a flocculant, a polymer which contains carboxylic acid groups or salt thereof, and (c) the use of multivalent cationic salts. The efficiency of solids/liquids separation in the Bayer process is thus improved by increasing the solids content of the separated solids stream. Also, the processes of the instant invention provide a solution to the problem of red mud transportation, utilization and disposal.

The processes of the present invention are designed to increase solids/liquids separation efficiency in Bayer alumina process streams by centrifugation, comprising (a) contacting and efficiently mixing a Bayer process stream with (i) a multivalent cationic salt and (ii) a water-soluble polymer containing pendant carboxylic acid groups or salts thereof, in an amount effective to flocculate the suspended solids therein, said polymer having a molecular weight ranging from about $1 \times 10^6$ to about $1 \times 10^8$, and (b) centrifuging resultant flocculated solids to thereby separate centrifuged solids from aqueous solution.

DETAILED DESCRIPTION OF THE PREFERRED EMBODIMENTS

According to the present invention, there is provided a solids/liquids separation process comprising (a) contacting and mixing a Bayer process stream with effective amounts of (i) a multivalent cationic salt and (ii) a water-soluble polymer containing pendant carboxylic acid groups or salts thereof, said polymer having a molecular weight ranging from about $1 \times 10^6$ to about $1 \times 10^8$, and (b) centrifuging resultant flocculated solids to thereby separate the solids resulting from centrifugation, or centrifuged solids, from aqueous solution.

In a preferred embodiment, there is provided a solids/liquids separation process comprising (a) contacting and mixing a Bayer process stream with effective amounts of (i) a magnesium or calcium salt or mixture thereof, and (ii) a water-soluble polymer containing pendant carboxylic acid groups or salts thereof, said polymer having a molecular weight ranging from about $1 \times 10^6$ to about $1 \times 10^8$, and (b) centrifuging resultant flocculated solids to thereby separate the solids resulting from centrifugation, or centrifuged solids, from aqueous solution.

In another embodiment, a solids/liquids separation process is provided comprising (a) contacting and mixing red mud with effective amounts of (i) a multivalent cationic salt and (ii) a water-soluble polymer containing pendant carboxylic acid groups or salts thereof, said polymer having a molecular weight ranging from about $1 \times 10^6$ to about $1 \times 10^8$, and (b) centrifuging resultant flocculated solids to thereby separate the solids resulting from centrifugation, or centrifuged solids, from aqueous solution.

The polymer to be employed in the present invention can vary rather broadly in type. It should be sufficiently stable to be effective under the process conditions used, e.g., high temperatures and strong caustic conditions, typically, 185°–225° F., and 4–400 grams per liter total alkali content (expressed as sodium carbonate equivalent).

Any water-soluble carboxylic acid group-containing polymer, or salt thereof, may be used in the process of the present invention. These polymers are well-known in the art and may be formed by polymerization or copolymerization of carboxylic acid group-containing monomers or salts thereof, e.g. monomers such (meth)acrylic acid or salts thereof. Homopolymers of (meth)acrylic acid and salts thereof are preferred. Copolymers of (meth)acrylic acid and acrylamide, and salts thereof, are especially preferred. The water-soluble carboxylic group-containing polymer, or salt thereof, may be a reaction product of another polymer with a reagent, e.g. may be derived from another polymer. For instance, polymers or copolymers of acrylamide may be hydrolyzed to produce a polymer having pendant carboxylic acid groups or salts thereof. The salts of the carboxylic acid-group containing monomers and polymers disclosed herein may contain any cation, preferably sodium, ammonium and potassium.

Water-soluble carboxylic acid group-containing polymers or salts thereof may be copolymers. Suitable comonomers which, by copolymerization, may form, for example, up to about 95 mole percent of the polymers useful herein can include (meth)acrylic acid, maleic anhydride, vinyl acetate, vinyl pyrrolidone, butadiene, styrene, amides, (meth) acrylamide, styrenesulfonic acid and salts thereof, acrylonitrile, and/or nitriles and the like as is known in the art and is set forth in the above-incorporated patents as long as such copolymers, terpolymers etc., are water-soluble. The weight average molecular weight of the polymers useful in the process of the present invention generally range from about $1 \times 10^6$ to about $1 \times 10^8$, preferably from about $3 \times 10^6$ to about $7 \times 10^7$, more preferably from about $5 \times 10^6$ to about $5 \times 10^7$. Weight average molecular weight may be determined by techniques well known to those skilled in the art, preferably light scattering.

Polymers useful in the instant invention may contain about 5% or more of recurring units which contain carboxylic acid groups or salts thereof, preferably about 10% or more, most preferably about 15% or more, by mole based on total moles of recurring units. Polymers useful in the instant invention generally contain about 100% or less of recurring units which contain carboxylic acid groups or salts thereof, preferably about 95% or less, most preferably about 80% or less, by mole based on total moles of recurring units. The carboxylic acid or salt group content of the polymer may be determined by nuclear magnetic resonance spectroscopy techniques well known to those skilled in the art.

The water-soluble carboxylic acid group-containing polymer, or salt thereof, may be a hydroxamated polymer e.g. may contain hydroxamic acid groups or salts thereof. The salts of the hydroxamic acid-group containing monomers and polymers disclosed herein may contain any cation, preferably sodium, ammonium and potassium. These polymers are well known in the art and can be derived from polymers containing pendant ester, amide, anhydride, nitrile, etc., groups by the reaction thereof with hydroxylamine or its salt, or by polymerization of a monomer which contains a hydroxamic acid group or salt thereof. Hydroxamated polymers generally contain more carboxylic acid groups or salts thereof than hydroxamic acid groups or salts thereof. Hydroxamated polymers derived from polymers containing amide groups e.g. polyacrylamide are preferred, and hydroxamated polymers which contain recurring acrylamide units are especially preferred.

For carboxylic acid group-containing polymers or salts thereof which contain hydroxamic acid groups or salts thereof, the degree of hydroxamation may vary over a broad range. The degree of hydroxamation, expressed as the mole percentage of recurring units which contain hydroxamic acid groups or salts thereof, based on total moles of recurring units, may range from about 1 to about 90 mole percent, preferably from about 5 to about 85 mole percent and, most preferably, from about 10 to about 60 mole percent. The degree of hydroxamation may be determined by nuclear magnetic resonance spectroscopy techniques well known to those skilled in the art.

Aqueous solutions of polymers derived from inverse emulsions and inverse microemulsions (herein referred to also as emulsions and microemulsions) function efficiently in the processes of the present invention. These emulsions and microemulsions may be carboxylic acid group-containing polymers or copolymers or salts thereof e.g. hydroxamated poly(acrylamide), poly(acrylamide/(meth)acrylic acid), carboxylated poly(acrylamide), salts thereof, etc. dispersed in oil. Emulsions and microemulsions of carboxylic acid group-containing copolymers or salts thereof which also contain hydroxamic acid groups or salts thereof are preferred. Dilute aqueous solutions of these polymers, useful in the instant invention, are derived from emulsions and microemulsions by "inverting" or "breaking"; e.g. adding the emulsions and microemulsions to water, optionally adding surfactant, and agitating to dissolve the polymer.

Mixtures of carboxylic acid group-containing polymers or salts thereof with other water-soluble polymers e.g polyacrylates, acrylate/amide copolymers, hydroxamated polymers, starch, dextran, salts thereof, etc. are effective and may be preferred. In mixtures comprised of carboxylic acid group-containing polymers or salts thereof that do not contain hydroxamic acid groups or salts thereof with hydroxamated polymers, the mixture preferably contains more of the former polymer than the latter, on a weight basis. The polymers may be blended while still in the emulsion or microemulsion form.

Finite effective amounts of water-soluble carboxylic acid group-containing polymers or salts thereof are used in conjunction with finite effective amounts of multivalent cationic salts in the present invention. The multivalent cationic salts or minerals may be utilized in solid form, preferably slurried or dissolved in water or sodium aluminate solution at a concentration of from about 1% to about 40%, preferably about 2% to about 20%, most preferably about 3% to about 10%, before being mixed with the Bayer process stream. Generally, any multivalent cationic salt or mixture thereof may be used, preferably inorganic salts of Group IIA metals, more preferably calcium salts such as calcium carbonate, calcium nitrate, calcium chloride, calcium oxide, calcium hydroxide, calcium sulfate, gypsum, lime, slaked lime, etc. and/or magnesium salts such as magnesium carbonate, magnesium oxide, magnesium hydroxide, magnesium sulfate, magnesium chloride, magnesium nitrate, magnesite, etc., most preferably slaked lime, lime, calcium carbonate, calcium oxide, calcium hydroxide, magnesium hydroxide, magnesium carbonate, and magnesium oxide. Mixtures of multivalent cationic salts may be used, as well as minerals containing one or more multivalent cationic salts e.g minerals containing both calcium and magnesium such as dolomite. To be effective, the mixing of the multivalent cationic salts with the Bayer process stream and the polymer may be in any order, e.g. in stages, using single or multiple addition points, etc. Preferably the multivalent cationic salt and the polymer are added substantially simultaneously to the Bayer process stream. Most preferably, at least part of the multivalent cationic salt and at least part of the Bayer process stream are mixed together before the water-soluble carboxylic acid group-containing polymer or salt thereof is added.

The technology of centrifugation is well known to those skilled in the art and a detailed description may be found in e.g Ullman's Encyclopedia of Industrial Chemistry, Volume B2, pp. 11-1 to 11-27, which is hereby incorporated herein by reference. Any centrifuge, including filter centrifuges, screen centrifuges, sedimentation centrifuges, decanting centrifuges, etc. may be used in the present invention. Sedimentation and decanting centrifuges are preferred, and classifying decanter centrifuges are most preferred.

The optimization of centrifuge performance is well known in the art e.g. D. E. Sullivan and P. A. Vesiland, "Centrifuge Trade-Offs", Operations Forum, pp. 24–27 (1986), which is hereby incorporated herein by reference. Feed volume depends on the size of the centrifuge and type of centrifuge. For a horizontal classifying decanter centrifuge with a bowl diameter of about 20 inches and a length of about 80 inches, a feed volume of about 4 to about 250 gallons per minute may be used, preferably about 20 to about 100 gallons per minute, most preferably about 30 to about 90 gallons per minute. Feed solids may range from about 0.01% to about 45%, preferably from about 15% to about 30%. The G-force is generally in the range of about 500 to about 3000×G, preferably in the range of about 1000 to about 1500×G. The differential between the scroll and the bowl is generally less than 150 revolutions per minute (rpm), preferably from about 1 to about 100 rpm, more preferably from about 10 to about 50 rpm, most preferably from about 30 to about 40 rpm.

Water-soluble polymers containing carboxylic acid groups or salts thereof and multivalent cationic salts may be mixed with the Bayer process stream, preferably the settler underflow or digester blow-off, in a holding tank prior to being introduced to the centrifuge, or pumped into the process stream feed line at single or multiple addition points, or added via a feed tube directly inside the centrifuge, or combinations thereof. Preferably, the polymer is added in the form of a dilute solution, e.g. from about 0.01% to about 3% solids, directly inside the centrifuge. Effective amounts of polymer generally range from about 200 to 4000, preferably 400 to 3000, most preferably 800 to 2000, grams of polymer per dry metric ton of Bayer process solids. While the multivalent cationic salt may be added in the solid form, a slurry or solution of the multivalent cationic salt is preferably mixed with the Bayer process stream prior to mixing with the polymer, more preferably in a holding tank prior to being introduced to the centrifuge. Best results may be obtained when the Bayer process stream is mixed with at least part of the multivalent cationic salt, then the resultant mixture mixed with the polymer directly inside the centrifuge. Generally, in a typical Bayer plant, the time interval between mixing of the Bayer process stream with the multivalent cationic salt and mixing of the multivalent cationic salt-treated Bayer process stream with the polymer is about 45 minutes or less, preferably about 35 minutes or less, more preferably about 10 minutes or less, most preferably about 5 minutes or less. Those skilled in the art recognize that the optimum polymer concentration in the dilute solution, and the optimum multivalent cationic salt concentration in the solution or slurry, depends on the solids level in the Bayer process stream, and can be ascertained by routine experimentation.

The polymers used in the present invention are employed by adding them, usually in the form of a dilute aqueous solution, in conjunction with multivalent cationic salts, to any digested bauxite ore process stream containing solubilized alumina and suspended solids dispersed throughout, in an amount at least sufficient to settle said suspended solids. Preferably, the polymers are added to settler underflow streams, washer train underflow streams, and/or digester blow-off streams. The process stream may undergo other chemical treatment e.g. acidification before, during or after the time that the polymer is added. Generally, for best results, at least about 0.1 milligrams (mg) of the polymer is added per liter of process stream.

When water-soluble polymers containing carboxylic acid groups or salts thereof are used in conjunction with multivalent cationic salts, preferably within the ranges specified above, to flocculate suspended Bayer process solids, preferably settler underflow, settler overflow, washer train underflow, washer train overflow, or digester blow-off streams, the flocculated solids are centrifuged to produce centrifuged solids (cake) and aqueous liquid (centrate). Preferably, the operation of the centrifuge is optimized according to principles well known in the art. The settler underflow streams are preferably primary settler underflow streams. The washer train underflow streams may be streams from any washer in the washer train, preferably the last washer underflow stream. The cake solids (the weight percent water-insoluble material) of the cake, or centrifuged solids, is higher than the feed solids, preferably greater than about 20%, more preferably greater than about 60%, most preferably greater than about 70%. Although is it generally preferred for the cake solids to be as high as possible, plugging of the centrifuge may occur at very high solids levels e.g. 90%. For obvious reasons plugging of the centrifuge is to be avoided. In practice, the desired solids level is generally dependent on whatever handling characteristics are desired in the centrifuged solids. The processes of the instant invention are particularly useful for concentrating, or dewatering, red mud, typically from settler underflow streams, and/or blow-off discharge.

The processes of the instant invention have particular value on difficult-to-centrifuge Bayer process streams e.g. red mud containing high levels of free caustic. The Bayer process stream generally contains a finite amount of free caustic, e.g. sodium hydroxide, preferably about 2 or more grams/liter of free caustic, more preferably about 5 or more grams/liter of free caustic, most preferably about 10 or more grams/liter of free caustic, as determined by titration methods known to those skilled in the art. The Bayer process stream generally contains about 400 or less grams/liter of free caustic, preferably about 350 or less grams/liter of free caustic, more preferably about 300 or less grams/liter of free caustic, most preferably about 250 or less grams/liter of free caustic.

It is generally desirable for the centrate, which is comprised of the aqueous liquid, e.g sodium aluminate liquor, to be clarified as much as possible; i.e., to have as low a concentration of suspended solids as possible to avoid contamination of the final product. The centrate solids level (the weight percent water-insoluble material in the aqueous liquid) is less than the feed solids, preferably 1% or less, more preferably 0.5% or less, even more preferably 0.2% or less, and most preferably 0.1% or less. The solids level in the centrate is frequently expressed as the centrate clarity.

Laboratory methods may be used to determine effective dosages of both water-soluble polymers containing carboxylic acid groups or salts thereof and multivalent cationic salt. A laboratory method termed "boxing" tends to give results that are representative of centrifugation results. In the "boxing" method, about 50 ml of a Bayer process stream e.g. red mud is placed into a first 100 ml beaker, along with a chosen amount of a slurry of multivalent cationic salts. A small amount of a solution of a water-soluble polymer containing carboxylic acid groups or salts thereof is placed into a second 100 ml beaker. The contents of the first beaker are then poured into the second beaker. The contents are then poured (or boxed) back and forth between the two beakers about 10 times. A visual evaluation is then made as to the physical state of the mixture. The mixture is termed "dispersed" if it was substantially unchanged by the process. A second small amount of a solution of a water-soluble polymer containing carboxylic acid groups or salts thereof is placed into the second 100 ml beaker and the boxing process is repeated as above. The cycle is repeated until the mixture changes from the dispersed state to the "flocculated" state or stage. The "flocculated" stage is characterized by small clumps and a "cottage cheese" appearance. Upon further addition of water-soluble polymer containing carboxylic acid groups or salts thereof, the mixture may reach the "water-shed" state or stage, separating into solids and liquids. Upon further addition of polymer, the mixture may become overdosed, redispersing and reverting back to the flocculated or dispersed state. The "boxing" test may be easily and quickly performed in a laboratory setting in order to determine the effective dose of both the water-soluble polymer containing carboxylic acid groups or salts thereof and the multivalent cationic salts. When used in effective amounts and in accordance with the centrifugation processes disclosed herein, the combination of water-soluble polymers containing carboxylic acid groups or salts thereof and multivalent cationic salt results in the desirable cake and centrate solids described above. Amounts of polymer and multivalent cationic salt effective for centrifugation of Bayer process streams are those that correlate with the amounts used to achieve the "flocculated" stage. Preferred amounts of polymer and multivalent cationic salt effective for centrifugation of Bayer process streams are those that correlate with the amounts used to achieve the "water-shed" stage.

Amounts of water-soluble polymer containing carboxylic acid groups or salts thereof and multivalent cationic salts, effective for solids-liquid separation of Bayer process streams by centrifugation, may also be determined by routine experimentation on the full-scale commercial equipment in the Bayer plant. However, it is frequently inconvenient and uneconomical to perform these routine experiments on the full-scale commercial equipment because the experiment may be disruptive of the process. Preferably, "boxing" tests are performed in the laboratory as described above, and the results obtained are carried over to the full-scale process equipment, with minor adjustments if necessary.

It is understood, that higher amounts of polymers than those just stated may be employed without departing from the scope of the invention, although generally a point is reached in which additional amounts of water-soluble carboxylic acid or salt group-containing polymer do not improve the separation rate over already achieved maximum rates e.g. the application is overdosed. Thus, it is uneconomical to use excessive amounts when this point is reached.

In practical terms, the centrifugation of flocculated solids to achieve both highly dewatered red mud and clear aqueous liquor is most often optimized in the context of other plant operations. For instance, the degree of red mud dewatering and the clarity of the aqueous liquor may be adjusted up or down to achieve other desirable outcomes such as lower power consumption, reduced waste disposal costs, increased rates of production, increased product purity, reduced consumption of raw materials, etc. Flocculation and centrifugation may be used in place of, or in addition to, or in combination with, the usual means of solids/liquids separation employed in the Bayer process e.g. settlers, decanters, thickeners, classifiers, and filters. For instance, the use of settlers may be reduced or avoided by flocculating and centrifuging blow-off discharge directly. A consecutive or intermittent series of centrifuges may also be employed, with the output of one as the input for another.

All references mentioned herein, including patents and patent applications, are hereby incorporated herein by reference. The following Examples are set forth for illustration purposes only and are not to be construed as limits on the present invention.

Polymer A is a commercially obtained water-soluble polymer with a molecular weight of about 15,000,000, containing about 15 mole percent sodium acrylate recurring units, 65 mole percent hydroxamate recurring units, and 20 mole percent acrylamide recurring units. Polymer B is a commercially obtained hydroxamated polymer microdispersion having about 11% polymer solids. Polymer B has a molecular weight of about 15,000,000, and contains about 66 mole percent sodium acrylate recurring units, about 14 mole percent hydroxamate recurring units, and about 20 mole percent acrylamide recurring units. Polymer C is a commercially obtained homopolymer of ammonium acrylate and has a molecular weight of about 10,000,000. Polymer D is a commercially obtained copolymer having about 95 mole % ammonium acrylate and about 5 mole % acrylamide and a molecular weight of about 15,000,000. Polymer E is a commercially obtained water-soluble polymer with a molecular weight of about 5,000,000, containing about 55 mole percent sodium acrylate recurring units, 25 mole percent hydroxamate recurring units, and 20 mole percent acrylamide recurring units. Polymer F is a commercially obtained water-soluble polymer with a molecular weight of about 15,000,000, containing about 40 mole percent sodium acrylate recurring units, 40 mole percent hydroxamate recurring units, and 20 mole percent acrylamide recurring units.

EXAMPLES 1–4

A 1% solution of polymer B is prepared by stirring Polymer B in water. Various amounts of Polymer B and lime are used to flocculate red mud using the "boxing" technique described above. The results are shown in Table 1. The results show that the desirable water-shed condition, which correlates with preferable centrifugation performance, is not obtained in the absence of lime. Without the presence of polymer B, the red mud remains dispersed when lime is used in the concentrations shown.

EXAMPLES 5–8

A 0.5% solution of polymer C is prepared by stirring Polymer C in water. Various amounts of Polymer C and lime are used to flocculate red mud using the "boxing" technique described above. The results are shown in Table 2. The results show that the red mud is not flocculated in the absence of lime. Without the presence of polymer C, the red mud remains dispersed when lime is used in the concentrations shown.

TABLE 1

| No. | Lime Conc., T/T | Mud, grams | Polymer B Dose 2 ml | Polymer B Dose 4 ml | Polymer B Dose 6 ml | Polymer B Dose 8 ml | Polymer B Dose 10 ml | Polymer B Dose 12 ml | Polymer B Dose 14 ml |
|---|---|---|---|---|---|---|---|---|---|
| 1C | 0 | 44.2 | D | F | F | D | D | | |
| 2 | 0.0035 | 47.8 | D | F | F | WS | D | | |
| 3 | 0.0175 | 48.0 | D | F | WS | WS | D | | |
| 4 | 0.0347 | 49.7 | D | F | F | WS | WS | WS | D |

C: Comparative
D: Dispersed
F: Flocculated
WS: Water-shed

TABLE 2

| No. | Lime Conc., T/T | Mud, grams | Polymer C Dose 2 ml | Polymer C Dose 4 ml | Polymer C Dose 6 ml |
| --- | --- | --- | --- | --- | --- |
| 5C | 0 | 51.4 | D | D | |
| 6 | 0.0035 | 50.1 | D | | |
| 7 | 0.0175 | 48.8 | F | D | D |
| 8 | 0.0347 | 50.2 | F | D | |

C: Comparative
D: Dispersed
F: Flocculated

EXAMPLES 9–12

A 1% solution of polymer A is prepared by stirring Polymer A in water. Various amounts of Polymer A and lime are used to flocculate red mud using the "boxing" technique described above. The results are shown in Table 3. The amounts of 1% polymer A used are given in columns 4–8. The results show that, when lime is used, the desirable water-shed condition, which correlates with preferable centrifugation performance, may be obtained at lower polymer doses than when lime is not present.

TABLE 3

| No. | Lime Conc., T/T | Mud, grams | Polymer A 5 ml | Polymer A 10 ml | Polymer A 15 ml | Polymer A 20 ml | Polymer A 25 ml |
| --- | --- | --- | --- | --- | --- | --- | --- |
| 9C | 0 | 49.6 | D | F | F | WS | D |
| 10 | 0.0035 | 50.8 | D | F | F | WS | WS |
| 11 | 0.0175 | 49.7 | D | F | WS | WS | WS |
| 12 | 0.0347 | 49.8 | D | F | F | WS | |

C: Comparative
D: Dispersed
F: Flocculated
WS: Water-shed

EXAMPLE 13

A 1% solution of polymer C is prepared by stirring Polymer C in water. Various amounts of Polymer C and a slurry of lime (lime dose of 15 kg per metric ton of red mud, dry basis) are used to flocculate red mud using the "boxing" technique described above. Polymer C is used at dosages of 2 ml, 3 ml, 4 ml and 6 ml. Good flocculation and some water-shed is achieved at polymer C levels of 3 ml and 4 ml.

EXAMPLE 14

A 1% solution of polymer D is prepared by stirring Polymer D in water. As in Example 13, various amounts of Polymer D and a slurry of lime (lime dose of 15 kg per metric ton of red mud, dry basis) are used to flocculate red mud using the "boxing" technique described above. Polymer D is used at dosages of 2 ml, 4 ml, 6 ml and 8 ml. Good flocculation was achieved at polymer D levels of 2 ml, 4 ml and 6 ml.

EXAMPLES 15–17 (COMPARATIVE)

Polymers B, D, E are stirred in water to give 1% solutions. Various amounts of each polymer are used to treat ~50 gram samples of red mud using the "boxing" technique described above. The results are shown in Table 4.

TABLE 4

| No. | Polymer | Polymer Dose 2 ml | Polymer Dose 4 ml | Polymer Dose 6 ml | Polymer Dose 8 ml | Polymer Dose 10 ml |
| --- | --- | --- | --- | --- | --- | --- |
| 15C | D | D | D | D | D | |
| 16C | B | F | F | F | F | F |
| 17C | E | F | F | WS | F | D |

C: Comparative
D: Dispersed
F: Flocculated
WS: Water-shed

EXAMPLES 19–23

Polymers A, B, C, D, and F are stirred in water to give 1% solutions. Various amounts of each polymer and a slurry of magnesium hydroxide (dose of 7.2 kilograms per metric ton of red mud, dry basis) are used to treat ~50 gram samples of red mud using the "boxing" technique described above. The results are shown in Table 5. Compared to Examples 15C and 16C, the performance of Polymers D and B is significantly enhanced by the magnesium salt (Examples 20 and 21).

TABLE 5

| No. | Polymer | Polymer Dose 2 ml | Polymer Dose 4 ml | Polymer Dose 6 ml | Polymer Dose 8 ml | Polymer Dose 10 ml | Polymer Dose 15 ml |
| --- | --- | --- | --- | --- | --- | --- | --- |
| 19 | C | D | D | F | | | |
| 20 | D | D | D | F | | | |
| 21 | B | F | F | WS | D | | |
| 22 | F | F | WS | WS | F | | |
| 23 | A | F | F | F | F | F | D |

D: Dispersed
F: Flocculated
WS: Water-shed

EXAMPLES 24–29 (COMPARATIVE)

Red mud slurry with a solids level of 10–25% and a free caustic level of about 200 grams per liter is fed with a variable speed pump at a feed rate of about 5 to 15 metric tons per hour to a horizontal classifying decanter centrifuge having a bowl diameter of about 20 inches and a length of about 80 inches. The G force is between about 1000×G and about 1600×G. The differential speed is about 15 to about 35 revolutions per minute (rpm). Polymers A, B, C, D, E and F, as ~1% solutions, are fed directly into the feed chamber of the centrifuge via a feed tube. The dosage of each polymer, in units of grams of real polymer per dry metric ton (g/DT) of centrifuged solids, ranges from about 600 to about 3000. Centrifuge performance, as measured by solids capture and centrate clarity, is generally poor.

EXAMPLES 30–35

Red mud slurry with a solids level of 10–25% and a free caustic level of about 200 grams per liter is fed with a variable speed pump at a feed rate of about 5 to 15 metric tons per hour to a horizontal classifying decanter centrifuge having a bowl diameter of about 20 inches and a length of about 80 inches. The G force is between about 1000×G and about 1600×G. The differential speed is about 15 to about 35 revolutions per minute (rpm). A lime slurry with a solids level of about 10% is added to the centrifuge feed at a dose ranging from about 3 to about 10 kilograms per metric ton of red mud, dry basis. Polymers A, B, C, D, E and F, as ~1% solutions, are fed directly into the feed chamber of the centrifuge via a feed tube. The dosage of each polymer, in units of grams of real polymer per dry metric ton (g/DT) of centrifuged solids, ranges from about 600 to about 3000. Centrifuge performance, as measured by solids capture and centrate clarity, is dramatically improved relative to Comparative Examples 24–29.

We claim:

1. A solids/liquids separation process comprising (a) contacting and mixing a Bayer process stream comprising red mud with amounts of (i) a multivalent cationic salt and (ii) a water-soluble polymer containing pendant carboxylic acid groups or salts thereof effective to form flocculated solids, said polymer having a molecular weight ranging from about $1\times10^6$ to about $1\times10^8$, and (b) centrifuging said flocculated solids to separate centrifuged solids from centrate, wherein said centrifuged solids have a solids content of greater than about 60% by weight based on total weight, and wherein said solids content is higher than when said (i) is not present.

2. A process as claimed in claim 1, wherein said Bayer process stream is blow-off discharge.

3. A process as claimed in claim 1, wherein said polymer is derived from an emulsion by adding said emulsion to water and agitating to dissolve said polymer.

4. A process as claimed in claim 1, wherein said centrifuging is carried out on a decanting centrifuge.

5. A process as claimed in claim 1, wherein said centrifuged solids have a solids content of 70% or greater, by weight based on total weight.

6. A process as claimed in claim 1, wherein said centrate contains less than 1% solids, by weight based on total weight.

7. A process as claimed in claim 1, wherein said centrate contains less than 0.5% solids, by weight based on total weight.

8. A process as claimed in claim 1, wherein said centrate contains less than 0.2% solids by weight based on total weight.

9. A process as claimed in claim 1, wherein said polymer contains recurring acrylamide units.

10. A process as claimed in claim 1, wherein said polymer is a homopolymer of acrylic acid.

11. A process as claimed in claim 9, wherein said polymer is a copolymer of acrylic acid and acrylamide.

12. A process as claimed in claim 9, wherein said polymer contains hydroxamic acid or hydroxamic acid salt groups.

13. A process as claimed in claim 12, wherein the degree of hydroxamation of said polymer ranges from about 5 to about 85 mole percent.

14. A process as claimed in claim 1, wherein said Bayer process stream is a settler underflow stream.

15. A process as claimed in claim 1, wherein said Bayer process stream contains from about 4 grams/liter to about 280 grams/liter of free caustic.

16. A process as claimed in claim 14, wherein said settler underflow stream is a primary settler underflow stream.

17. A process as claimed in claim 1, wherein said Bayer process stream is a washer underflow stream.

18. A solids/liquids separation process, comprising (a) contacting and mixing a Bayer process stream comprising red mud with amounts of (i) a calcium or magnesium salt or mixture thereof, and (ii) a water-soluble polymer containing pendant carboxylic acid groups or salts thereof effective to form flocculated solids, said polymer having a molecular weight ranging from about $1\times10^6$ to about $1\times10^8$, and (b) centrifuging said flocculated solids to separate centrifuged solids from centrate, wherein said centrifuged solids have a solids content of greater than about 60% by weight based on total weight, and wherein said solids content is higher than when said (i) is not present.

19. A process as claimed in claim 18, wherein said calcium or magnesium salt is an aqueous slurry or aqueous solution.

* * * * *